Oct. 30, 1962

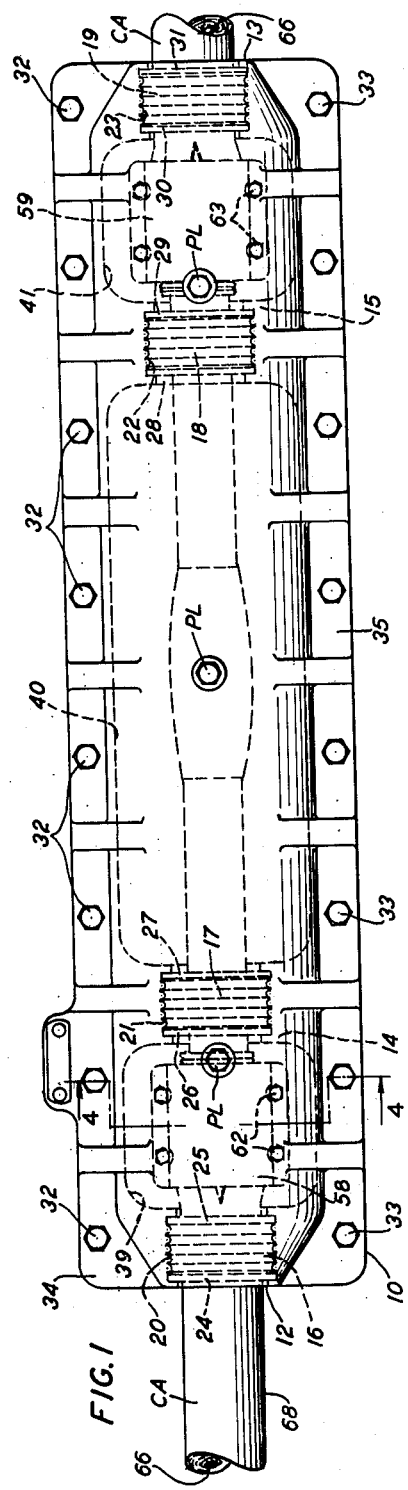
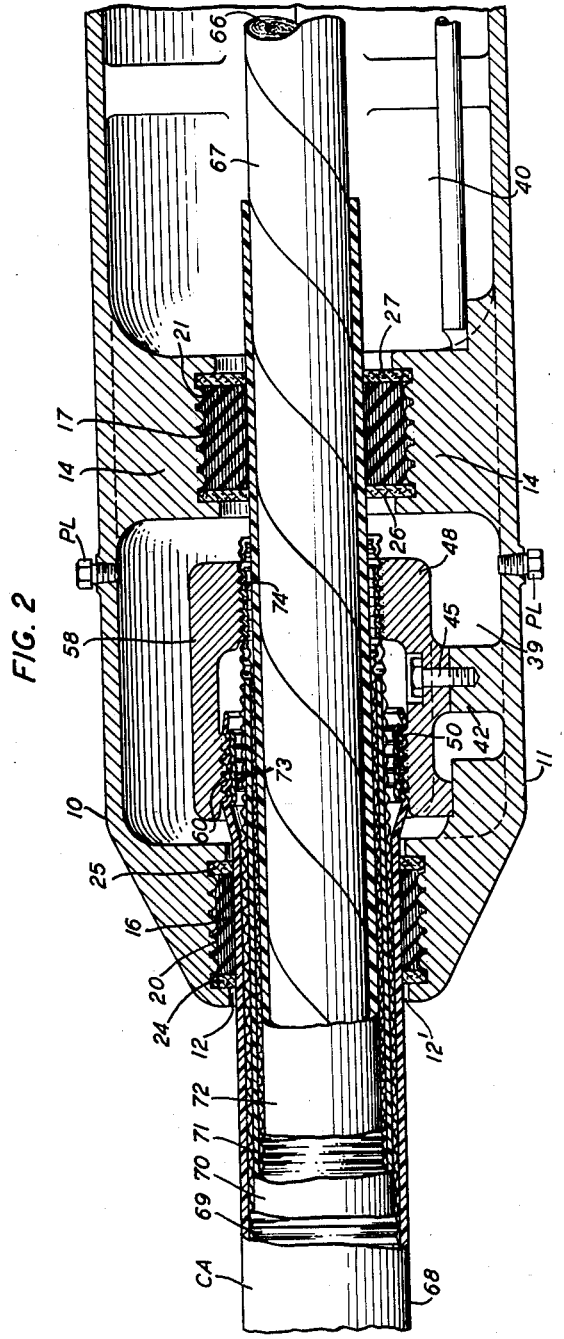

G. H. DUVALL ET AL 3,061,666

SPLICE CLOSURE FOR SHEATHED CABLE

Filed March 17, 1961

INVENTORS G.H.DUVALL
W.E.HAMMERSLA
P.P.KOLISS

BY

ATTORNEY

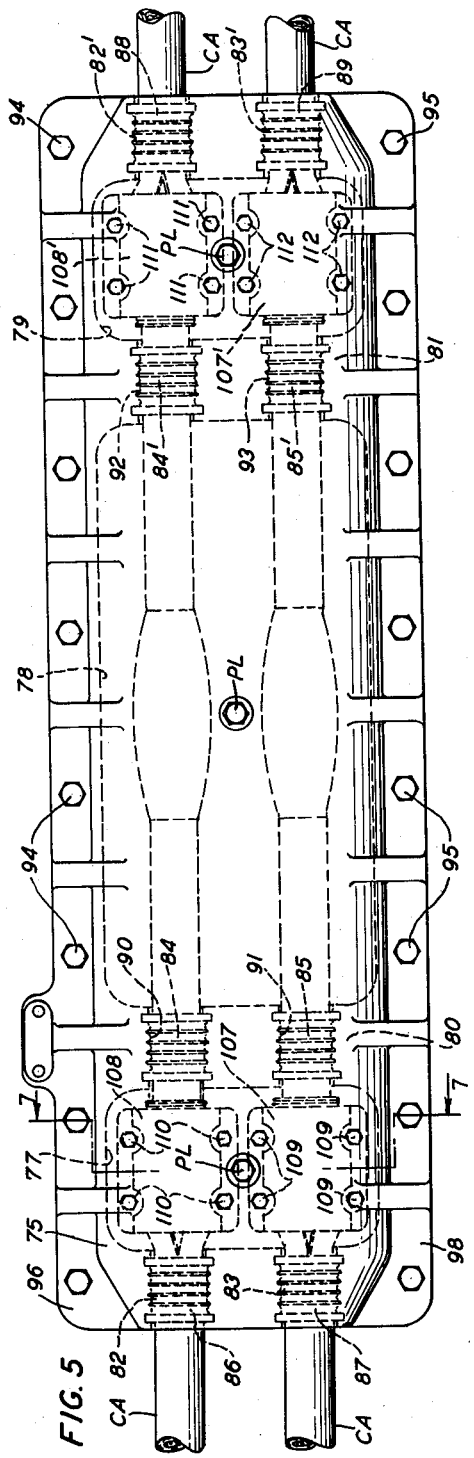
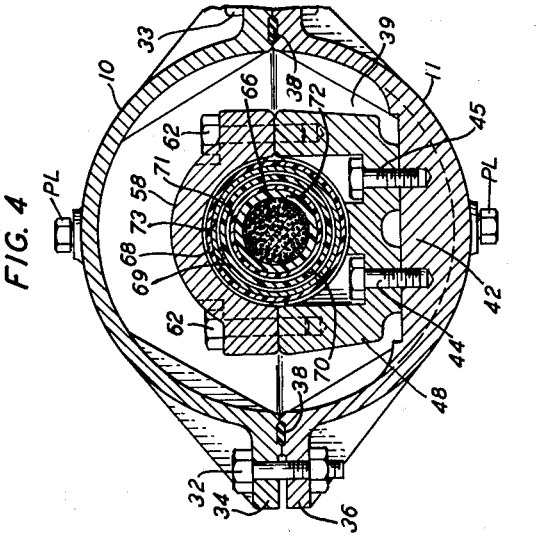
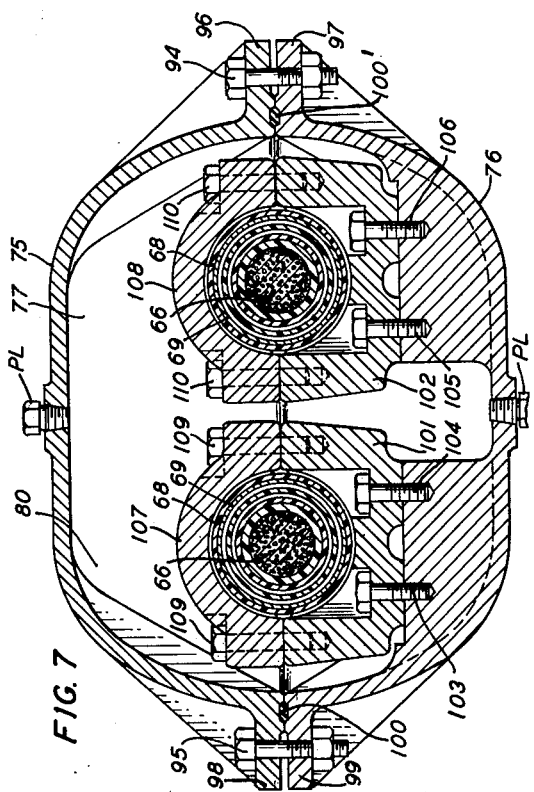
FIG. 5
FIG. 4
FIG. 7
INVENTORS G.H. DUVALL
W.E. HAMMERSLA
P.P. KOLISS
BY
ATTORNEY

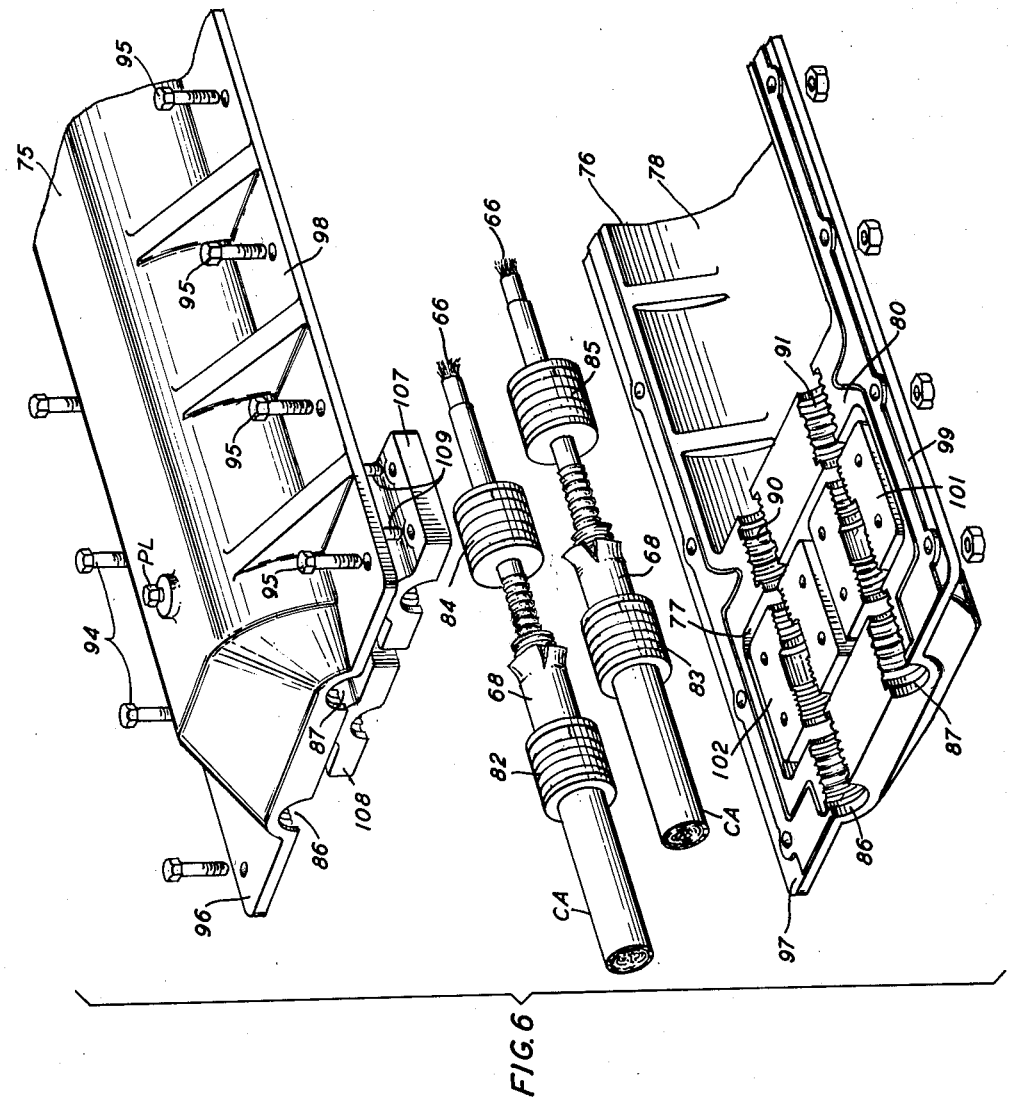

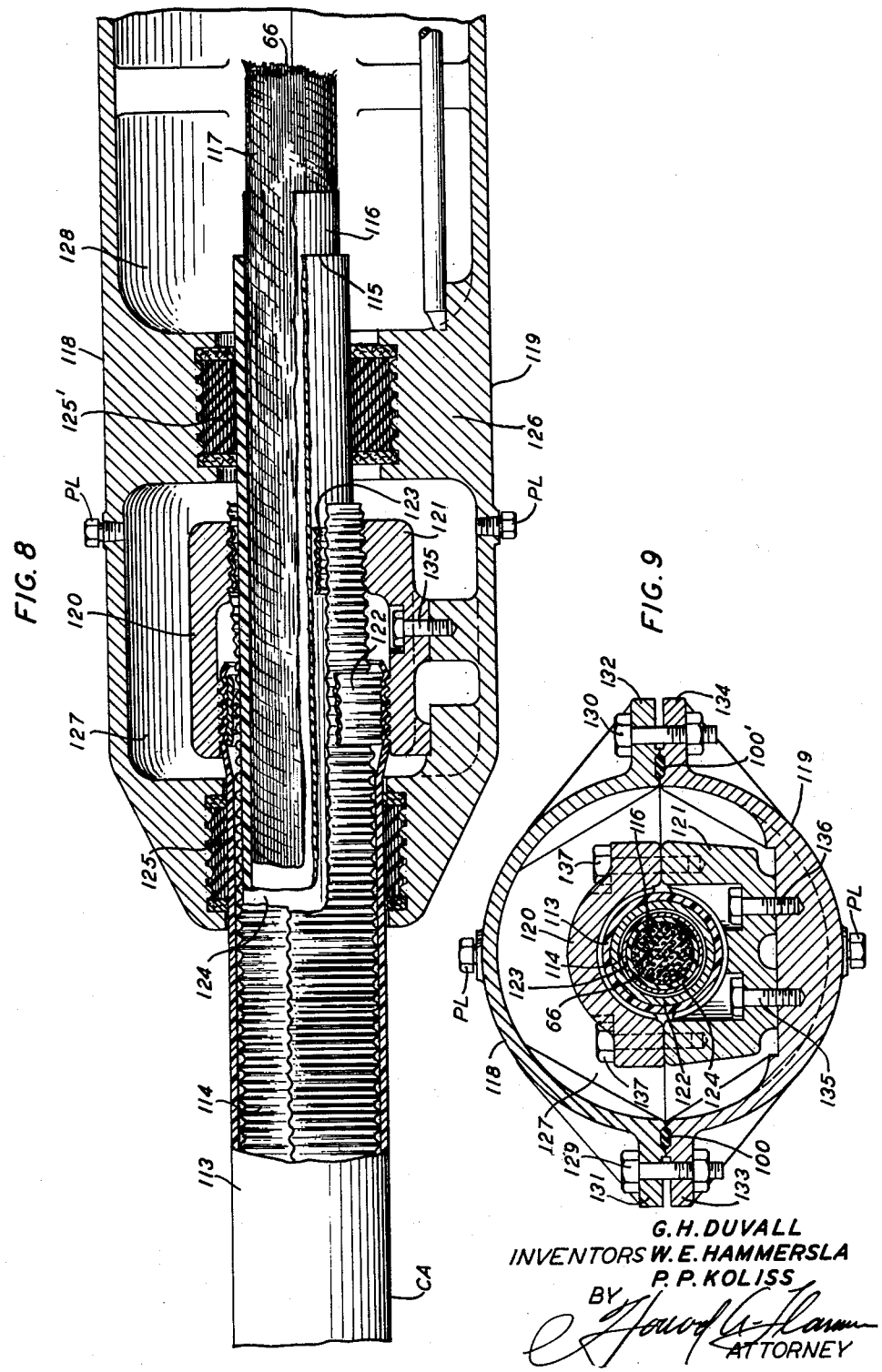

United States Patent Office 3,061,666
Patented Oct. 30, 1962

3,061,666
SPLICE CLOSURE FOR SHEATHED CABLE
George H. Duvall, Baltimore, William E. Hammersla, Middle River, and Peter P. Koliss, Towson, Md., assignors to Bell Telephone Laboratories, Incorporated, New York, N.Y., a corporation of New York
Filed Mar. 17, 1961, Ser. No. 96,480
8 Claims. (Cl. 174—92)

This invention relates to splices or joints in electrical cable and, more particularly, to a splice case of the mechanical type which provides a closure for joints in multiconductor communication cables.

An object of the present invention is to provide a mechanical splice case or closure for enclosing joints in plastic or metallic sheathed cable which protects the enclosed splice or joint from the elements and is substantially gas tight.

Another object of our invention is the provision of a splice case or closure which comprises mating halves which are intended to be installed in a manner to encompass an existing joint, for example in an unbroken or continuous length of cable, where the ends are not free, or over a new joint wherein the cable ends are free.

A further object of this invention contemplates the provision of a mechanical splice closure which comprises relatively few parts and is as strong mechanically, when installed, as the cable itself. Furthermore, this structure provides electrical continuity of the conductive elements of the cable without substantially increasing the electrical resistance thereof.

A feature of our invention is the provision of a mechanical splice case or closure comprising similar halves or castings which define a plurality of chambers wherein the abutting ends of the cable are spliced and located in a central chamber. The structure provides means wherein the cable itself is clamped by independent means which in turn are secured to the inner surface of one of the halves.

A further feature of the invention is the provision of a splice case or housing wherein the securing of the cable ends in the casting is not dependent upon the pressure exerted by the mating portions of the halves, which make up the closure, but is effected by independent clamping means located in the end chambers in one of the halves whereby the cable ends are secured in juxtaposition with respect to each other during splicing.

A still further feature of our invention is the provision of a mechanical splice case or closure wherein a sheathed cable having underlying layers of metal, separated by a layer of insulation, is firmly clamped so that the strain on the cable is equally distributed to the layers of material which comprises the protecting sheath and is not placed on the individual insulated conductors which make up the core of the cable.

A still further feature of the invention is the provision of compressible means located on each side of the sheath clamping means for sealing the cable where it enters and leaves the end chambers.

A still further feature of our invention is the provision of a mechanical splice case or closure which will accommodate a plurality of sheathed cables, wherein individual cables are separately clamped to give complete independence of manipulation.

The splice case or closure of this invention, which is of the mechanical type as differentiated from the well-known lead sleeve and wiped joint, is particularly adapted to, but not necessarily limited to, multiconductor cables having a plurality of insulated conductors confined within a jacket of insulating material and having one or more layers of a thin metallic sheath positioned thereover with a layer of insulation therebetween and an outer sheath of plastic surrounding the whole.

Our invention contemplates a method and means for expeditiously making joints or splices in multiconductor cable of the type referred to above.

The splice closure or case of this invention comprises, in the main, two similar mating halves or castings constructed of a suitable material, for example steel, aluminum alloy, plastic or any other material having the desired mechanical strength and corrosion resistant properties. A suitable cementitious material is interposed between the mating marginal edges of the mating halves to effect a permanent seal therebetween.

The applicants have found that castings of aluminum alloy are particularly advantageous since they combine lightness of weight with structural stability.

In the preferred embodiment of our invention, each end of the castings which comprises the splice closure of this invention is necked down or reduced in size and is provided with cavities for the reception of a sealing material such as tape or a preformed bushing. These bushings act as stuffing boxes or glands at the point where the cable enters or leaves the closure when the two mating halves are clamped together.

Located adjacent to and in communication with the aforementioned cavities are suitable trough-shaped chambers formed by the side walls of the halves and shoulders or partitions which extend across the trough from wall to wall. These partitions, like the necked-down portions of the castings, are provided with arcuate shaped cavities for the reception of a sealing member or bushing substantially the same as that used at the cable entrance and provide an enlarged central trough-shaped chamber for the reception of the cable splice.

In order to provide a strong mechanical joint between the ends of the cable and the closure, clamping means are located and firmly secured in the end chambers. These clamping means do not depend on the two mating halves or castings of the closure to secure the cable to the closure but are separate clamps secured in one of the castings and act to firmly grip the cable independently of the mating halves of the closure. Thus, we have the mating halves or castings cooperating to provide a tight waterproof seal only and the clamps secured in the end chambers in one of the halves or castings firmly gripping the multilayer sheath of the cable to provide a strong mechanical joint.

When it is desirable to accommodate a plurality of cables, the mating halves of the castings may be enlarged and provided with cable entrances of the desired number and size. Suitable clamps of the required number may be secured in position in the end chambers in a manner as heretofore described.

The invention will be more clearly understood from the following detailed description when read with reference to the following drawings of which:

FIG. 1 is a top plan view of the splice closure of this invention, the interior thereof and a portion of a cable positioned therein shown by dotted lines;

FIG. 2 is an enlarged longitudinal fragmentary sectional view of one end of the splice closure with parts broken away to show the internal structure and to bring out the cooperation between the components of the closure and the cable per se;

FIG. 4 is an enlarged cross sectional view taken on line 4—4 of FIG. 1;

FIG. 5 is a top plan view of a modified type of splice closure wherein a plurality of cables is arranged to be accommodated;

FIG. 6 is a fragmentary exploded view in perspective of the splice case illustrated in FIG. 5;

FIG. 7 is an enlarged cross sectional view taken on line 7—7 of FIG. 5;

FIG. 8 is a fragmentary longitudinal sectional view of a modified type of splice closure wherein the cable positioned therein is of the single metallic inner wrapped type with a layer of insulation interposed on each side thereof; and FIG. 9 is a cross sectional view taken on line 9—9 of FIG. 8.

Figure 3:
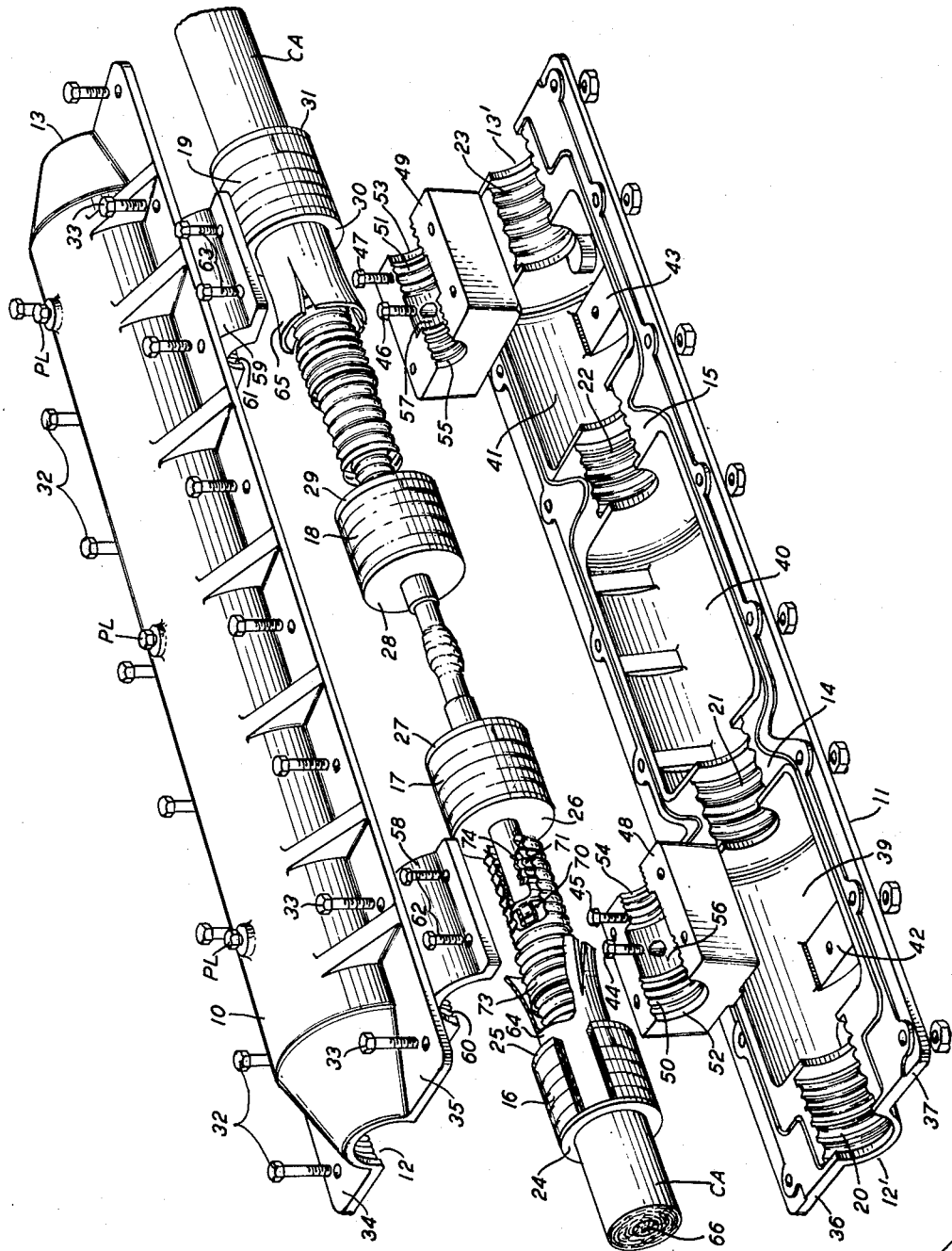
FIG. 3 is an exploded view in perspective of the splice closure shown in FIGS. 1 and 2.

In the preferred embodiment of our invention as shown in FIG. 1 and the associated FIGS. 2, 3 and 4, we have provided a substantially cylindrical elongated housing which is intended to enclose a cable splice, and firmly embrace the sheath of the cable at the cable entrance to prevent the escape of gas and the entrance of moisture. Our structure, which is herein described, also firmly anchors the ends of the cable to the closure in such a manner that the mechanical strength thereof is substantially the same as the cable itself.

The proposed structure comprises two substantially similar elongated trough-shaped mating halves or castings 10 and 11, which are arranged to embrace the cable CA. The splice closure of our invention may be constructed of steel, aluminum alloy, plastic or any other suitable material which is mechanically strong and highly resistant to corrosion. However, we have found that if the members or castings 10 and 11 are constructed from an aluminum alloy that the rigid requirements are adequately met.

As shown in dotted lines in FIG. 1 and in full lines in FIGS. 2 and 3, a gas and moisture tight seal at the cable entrances 12, 12', 13 and 13' and at the intermediate partitions of shoulders 14 and 15 is provided by means of the resilient bushings 16, 17, 18 and 19 which may be built up from a suitable resilient type of tape or made from a solid resilient material. These bushings are positioned in the cavities 20, 21, 22 and 23 between the washers 24, 25, 26, 27, 28, 29, 30 and 31 and are confined therein when the two mating halves or castings 10 and 11 are forced into intimate contact by means of the bolts 32 and 33 located in the flange portions 34, 35, 36 and 37 of the respective halves after a cementitious material 38 is introduced therebetween to firmly seal the joint between the respective members.

As shown in FIGS. 1, 2, 3 and 4 and more in detail in FIG. 3, the halves or castings 10 and 11 are provided with three chambers 39, 40 and 41 formed by the partitions or shoulders 14 and 15 previously referred to and the cooperation of the mating halves of the castings 10 and 11.

Positioned in the end chambers 39 and 41 and secured to the bosses 42 and 43 in the bottom of the casting 11, by means of suitable bolts 44, 45, 46 and 47, are the pillow block members 48 and 49. The pillow blocks 48 and 49 are each provided with coaxially grooved arcuate bores 50 and 51, the outer portions 52 and 53 of which have radii slightly larger than the inner portions 54 and 55 and are provided with smooth connecting surfaces 56 and 57 therebetween.

As shown, there are provided mating clamping members 58 and 59. The mating clamping members 58 and 59 are provided with arcuate bores 60 and 61 which are coaxially grooved and coincide with the bores 50 and 51 in the blocks 48 and 49 when they are clamped in position as shown in FIGS. 2 and 4 by means of the bolts 62 and 63.

The pillow blocks 48 and 49 are arranged to receive and securely clamp the ends of the cable CA by means of the pressure exerted thereon by the upper clamp members 58 and 59 when the prepared ends of the cable CA, as shown at 64 and 65, are positioned therebetween and secured by means of the bolts 62 and 63.

The ends 64 and 65 of the cable CA are peeled back to expose a substantial portion of the inner insulated conductors 66 which make up the core of the cable and which are covered with a thin layer of insulating core wrapping material 67. The cable CA, as shown in FIGS. 1, 2, 3 and 4, comprises an outer sheath 68 of insulating material, an underlying sheath of thin metal 69, a layer of insulating material 70 thereunder, a thin layer of metal 71 under the insulating material, a layer of insulation 72, and a core of insulated wire 66 with a core wrap 67 thereover.

As shown in detail in the various figures and with particular attention to FIG. 2, the outer plastic sheath 68 is split longitudinally and is firmly gripped between the grooves in the outer bore 60 of the upper clamp 58 and the grooves in the lower pillow block 48 with the circumferentially grooved clamp ring 73 interposed between the sheath 68 and the metallic layer 69, thus backing up the insulation and providing a strong firm joint therebetween.

The thin metal layer 69, as shown, continues some distance beyond the sheath 68 and is positioned in the narrow inner bore 54, between the upper clamp 58, the ring 74 and the lower block 48. The layer of insulation 70 which underlies the metal layer 69 terminates a short distance beyond the outer layer 68, and has positioned thereunder a second layer of metal 71, which extends substantially the same distance as the first metal layer 69, and is brought into contact therewith some distance from the end of the second layer of the insulation 70 where it is interposed between the ring 74 and the upper clamp 58 and the lower block 48, thereby bringing both ends of the metal layers 69 and 71 together into the chamber 40 and clamping them securely in position to provide a firm electrical bond therebetween.

The inner insulating sheath 72 continues unbroken through the bushings 16 and 17 and terminates a short distance beyond the partition or shoulder 14 into the chamber 40 where it is stripped back to provide access to the conductors 66 preparatory to the splicing thereof.

After the cable CA is prepared and positioned in the blocks 48 and 49, as heretofore described, a suitable adhesive or cement 38 which may be in string form, is positioned in the grooved portions between the flanges 34, 35, 36 and 37 of the two castings 10 and 11 to effect a seal therebetween when the bolts 32 and 33 are turned home. This action also compresses the bushings 16, 17, 18 and 19 around the cable CA to effect a seal around the cable itself and between the castings to prevent the entrance of moisture into the chambers 39, 40 and 41 and also to prevent the escape of gas. Plugs PL are provided for the introduction of fluid into the chambers 39, 40 and 41 in order to give additional moisture protection if desired.

By the construction as heretofore described, we have provided a mechanical type of splice closure in which the sealing of the cable in the housing and the mechanical joining of the cable to the housing are separate and distinct neither one depending upon the other for its proper function.

In the modified form of our invention as disclosed in FIGS. 5, 6 and 7, we have shown a mechanical splice closure of the type heretofore described with reference to FIGS. 1, 2, 3 and 4 except that the construction of the case per se has been modified to accommodate a plurality of cable receiving chambers.

In the structure as disclosed in FIGS. 5, 6 and 7, we have provided two mating halves or castings having a substantially rectangular cross section which comprises an upper housing 75 and a lower housing 76. These housings, like the ones previously described with reference to FIGS. 1, 2, 3 and 4 contain three chambers 77, 78 and 79 formed by the partitions or shoulders 80 and 81 cooperating with the side walls of the respective castings.

Since the end chambers 77 and 79 and the securing of the cables CA are substantially the same, we have in FIG. 6 disclosed only a fragmentary portion of the splice closure and this figure adequately illustrates the modified structure.

As shown in FIGS. 5, 6 and 7, the cables CA—CA enter the housing ends and are sealed against the entrance of moisture and gas by suitable bushings 82, 83, 84 and 85 and 82', 83', 84' and 85' in the same manner as previously described with reference to FIGS. 1, 2, 3 and 4 and are confined between the two castings 75 and 76 in the arcuate recesses or cavities 86, 87, 88 and 89 in the ends of the castings and 90, 91, 92 and 93 in the partitions or shoulders 80 and 81 when the two castings 75 and 76 are secured together in the manner previously described with reference to FIGS. 1, 2, 3 and 4, by means of the bolts 94 and 95 which are positioned around the flanges 96 and 97, and 98 and 99 with a suitable adhesive or cement 100 and 100' therebetween.

The cable ends are prepared in the same manner as described with reference to FIGS. 1, 2, 3 and 4 and are clamped in the same manner, between the pillow blocks 101 and 102, which are secured in the lower housing by means of the bolts 103, 104, 105 and 106, and the upper clamps 107 and 108 at the end of the housing by means of suitable bolts 109, 110, 111 and 112.

We have thus provided a splice closure which will accommodate a plurality of sheathed cable in a manner which will prevent the escape of gas, the entrance of moisture and which will be as strong mechanically as the cable embraced therebetween.

The modified structure as disclosed in FIGS. 8 and 9 is substantially the same as that disclosed in FIGS. 1, 2, 3 and 4 and differs only in that the cable CA comprises an outer sheath 113 of insulating material, an underlying layer 114 of metal having a lapped joint, a layer of insulation 115 under the metal, a core covering 116 and a core member 117 comprising a plurality of insulated conductors 66.

As shown in FIGS. 8 and 9, the cable CA enters a necked-down portion of the housing which comprises the mating halves or castings 118 and 119, through a resilient bushing 125 in the same manner as that heretofore described with reference to the structure disclosed in FIGS. 1, 2, 3 and 4. The sheath of cable CA is prepared in the heretofore described manner with the insulation 113 gripped between the upper clamp 120, the pillow block 121 and the ring member 122 at the outer end of the closure.

The metal layer 114 extends some distance beyond the termination of the insulating sheath 113 and is firmly gripped at the inner end of the clamp 120 and the pillow block 121 with the ring 123 interposed therebetween with the inner insulating sheath 124 extending a short distance from the end of the shoulder 126.

As shown the cable CA is positioned in the bushing 125 in the end of the case and in bushing 125' which is positioned in the partition or shoulder 126 which separates the end chamber 127 from the central chamber 128.

Like the structures previously described, suitable bolts 129 and 130 pass through the flanges 131, 132, 133 and 134 on the castings 118 and 119 and firmly hold them together after a suitable cement material 132 and 132' has been interposed therebetween to provide a tight joint. Suitable bolts 135 and 136 secure the pillow block 121 to the lower casting 119 and bolts 136 and 137 hold the clamp 120 in firm engagement with the cable CA. Suitable plugs PL are provided for the introduction of fluid into the chambers.

While we have shown and described the preferred embodiment of our invention, it is to be understood that various changes and modifications may be made therein without departing from the spirit and scope of the invention.

What is claimed is:

1. A splice closure for enclosing joints in sheathed cable having an underlying layer of metallic material, comprising a pair of mating trough-shaped body members having openings in the ends thereof to permit the ingress and egrees of a cable, secured together along their marginal edges to define a central chamber and two flanking end chambers formed by inwardly extending shoulders, said shoulders profiled to permit the passage of a cable, means located between the periphery of the cable and the inner surface of said profiled portions of said shoulders for sealing the space therebetween, clamping means positioned in said end chambers and secured to one of said body members for simultaneously clamping the outer sheath and the underlying metallic layer and sealing means interposed between the mating halves of the body members.

2. A splice closure for enclosing joints in sheathed cable having an underlying layer of metallic material, comprising a pair of mating elongated trough-shaped body members having openings in the ends thereof to permit the ingress and egress of a cable, secured together along their marginal edges to define a central chamber and two flanking end chambers formed by inwardly extending shoulders, said shoulders profiled to permit the passage of a cable, resilient bushings located between the periphery of the cable and the inner surface of said profiled portions of said shoulders for sealing the space therebetween, clamping means positioned in said end chambers and secured to one of said body members for simultaneously clamping the outer sheath and the underlying metallic layer and sealing means interposed between the mating halves of the body members.

3. A splice closure for enclosing joints in sheathed cable having an underlying layer of metallic material, comprising a pair of mating elongated trough-shaped body members having a plurality of openings in the ends thereof to permit the ingress and egress of cables, secured together along their marginal edges to define a central chamber and two flanking end chambers formed by inwardly extending shoulders, said shoulders profiled to permit the passage of a cable, resilient bushings located between the periphery of the cable and the inner surface of said profiled portions of said shoulders for sealing the space therebetween, clamping means positioned in said end chambers and secured to one of said body members for simultaneously clamping the outer sheath and the underlying metallic layer and sealing means interposed between the mating halves of the body members.

4. A splice closure for enclosing joints in plastic sheathed cable having an underlying layer of metallic material, comprising a pair of mating trough-shaped body members having openings in the ends thereof to permit the ingress and egress of a cable, secured together along their marginal edges to define a central chamber and two flanking end chambers formed by inwardly extending shoulders, said shoulders profiled to permit the passage of a cable, means located between the periphery of the cable and the inner surface of said profiled portions of said shoulders for sealing the space therebetween, clamping means positioned in said end chambers and secured to one of said body members for simultaneously clamping the outer plastic sheath and the underlying metallic layer and sealing means interposed between the mating halves of the body members.

5. A splice closure for enclosing joints in plastic sheathed cable having an underlying layer of metallic material, comprising a pair of mating elongated trough-shaped body members having openings in the ends thereof to permit the ingress and egress of a cable, secured together along their marginal edges to define a central chamber and two flanking end chambers formed by inwardly extending shoulders, said shoulders profiled to permit the passage of a cable, resilient bushings located between the periphery of the cable and the inner surface of said profiled portions of said shoulders for sealing the space therebetween, clamping means positioned in said end chambers and secured to one of said body members for simultaneously clamping the outer plastic sheath and the underlying metallic layer and sealing means interposed between the mating halves of the body members.

6. A splice closure for enclosing joints in sheathed cable having an underlying layer of metallic material, comprising a pair of mating trough-shaped body members having openings in the ends thereof to permit the ingress and egress of a cable, secured together along their marginal edges to define a central chamber and two flanking end chambers formed by inwardly extending shoulders, said shoulders profiled to permit the passage of a cable, means located between the periphery of the cable and the inner surface of said profiled portions of said shoulders and between the openings in the closure ends for sealing the space therebetween, clamping means positioned in said end chambers and secured to one of said body members for simultaneously clamping the outer sheath and the underlying metallic layer and sealing means interposed between the mating halves of the body members.

7. A splice closure for enclosing joints in sheathed cable having an underlying layer of metallic material, comprising a pair of mating elongated trough-shaped body members having openings in the ends thereof to permit the ingress and egress of a cable, secured together along their marginal edges to define a central chamber and two flanking end chambers formed by inwardly extending shoulders, said shoulders profiled to permit the passage of a cable, resilient bushings located between the periphery of the cable and the inner surface of said profiled portions of said shoulders and between the openings in the closure ends for sealing the space therebetween, clamping means positioned in said end chambers and secured to one of said body members for simultaneously clamping the outer sheath and the underlying metallic layer and sealing means interposed between the mating halves of the body members.

8. A splice closure for enclosing joints in sheathed cable having an underlying layer of metallic material, comprising a pair of mating trough-shaped body members having a plurality of openings in the ends thereof to permit the ingress and egress of cables, secured together along their marginal edges to define a central chamber and two flanking end chambers formed by inwardly extending shoulders, said shoulders profiled to permit the passage of a cable, resilient bushings located between the periphery of the cable and the inner surface of said profiled portions of said shoulders and between the openings in the closure ends for sealing the space therebetween, clamping means positioned in said end chambers and secured to one of said body members for simultaneously clamping the outer sheath and the underlying metallic layer and sealing means interposed between the mating halves of the body members.

No references cited.